United States Patent
Tzimpragos et al.

(10) Patent No.: US 10,621,067 B1
(45) Date of Patent: Apr. 14, 2020

(54) DATA UNIT BREAKPOINTING CIRCUITS AND METHODS

(71) Applicant: Xilinx, Inc., San Jose, CA (US)

(72) Inventors: Georgios Tzimpragos, Goleta, CA (US); Jason Villarreal, Los Gatos, CA (US); Amitava Majumdar, San Jose, CA (US); Kumar Deepak, San Jose, CA (US); Yuxiong Zhu, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 118 days.

(21) Appl. No.: 15/888,984

(22) Filed: Feb. 5, 2018

(51) Int. Cl.
*G06F 9/44* (2018.01)
*G06F 9/455* (2018.01)
(Continued)

(52) U.S. Cl.
CPC ...... *G06F 11/3636* (2013.01); *G06F 11/3624* (2013.01); *G06F 11/3664* (2013.01)

(58) Field of Classification Search
CPC .. G06F 1/3203; G06F 1/3237; G06F 9/30167; G06F 9/3879; G06F 15/7842; G06F 11/0757; G06F 11/3656; G06F 11/3648; G06F 11/3636; G06F 11/3624; G06F 11/3664; G06F 11/27; G06F 17/5027; G06F 17/5022; G06F 1/08; H03L 7/087; H03L 7/0995; H03L 7/033; H03L 7/18; A61M 1/28; A61M 1/282; A61M 1/288; A61M 1/166; A61M 2205/12; Y02D 10/128; G06T 11/20; G06T 11/60; H01L 2924/00; H01L 2924/32225; H01L 2924/48227; H01L 2924/73265; G01R 31/318516; G01R 31/2882
See application file for complete search history.

(56) References Cited

U.S. PATENT DOCUMENTS 6,192,427 B1 *  2/2001  Li ........................... G06T 1/60
                                                   700/94
7,346,481 B1 *  3/2008  Ballagh ............... G06F 17/5009
                                                   703/14

(Continued)

OTHER PUBLICATIONS

Lahiouel et al., A semi-formal approach for analog circuits behavioral properties verification, 2 pages (Year: 2014).*

(Continued)

*Primary Examiner* — Thuy Dao
(74) *Attorney, Agent, or Firm* — Crawford Maunu PLLC (57) ABSTRACT

An execution circuit is configured to input data units, perform unit operations on the data units, and register results of the unit operations in response to oscillations of a clock signal. A control circuit controls activation and deactivation of the unit operations. A debug circuit inputs, in parallel with input of the data units to the execution circuit, at least one of the data unit or one or more attributes associated with the data unit. The debug circuit evaluates, upon each input of the at least one of the data unit or the one or more attributes, a breakpoint condition based on the at least one of the data unit or the one or more attributes while the clock signal oscillates. In response to evaluation of the breakpoint condition indicating a break, the debug circuit stops oscillations of the clock signal to the execution circuit.

20 Claims, 8 Drawing Sheets

(51) Int. Cl.
    *G06F 11/00*     (2006.01)
    *H03K 19/177*     (2020.01)
    *G06F 11/36*     (2006.01)

(56) References Cited

U.S. PATENT DOCUMENTS

| | | | | |
|---|---|---|---|---|
| 8,922,253 | B2* | 12/2014 | Rey | H03L 7/0802 327/108 |
| 10,128,858 | B2* | 11/2018 | Goldberg | H04L 7/0331 |
| 10,411,720 | B2* | 9/2019 | Lenzen | G04F 10/005 |
| 2007/0168651 | A1* | 7/2007 | John | G06F 11/2236 712/227 |
| 2008/0058962 | A1* | 3/2008 | Ward | G05B 19/056 700/17 |
| 2011/0126175 | A1* | 5/2011 | Suizu | G06F 11/3636 717/129 |
| 2011/0138364 | A1* | 6/2011 | Hosokawa | G06F 17/5031 717/129 |

OTHER PUBLICATIONS

Fang et al., A Simplified Phase Model for Simulation of Oscillator-Based Computing Systems, 20 pages (Year: 2017).*

Specification and drawings for U.S. Appl. No. 15/451,068, filed Mar. 6, 2017, Villarreal et al.

Microsoft, "Using Breakpoints," copyright 2017, downloaded Dec. 14, 2017, https://msdn.microsoft.com/en-us/library/5557y8b4(d=printer).aspx, Microsoft Corp., Redmonnd, Washington, USA.

* cited by examiner

DATA UNIT BREAKPOINTING CIRCUITS AND METHODS

TECHNICAL FIELD

The disclosure generally relates to breakpoints on data units.

BACKGROUND

One technique for improving performance of a software system is to implement selected sections as hardware accelerators. Those sections of the system that exhibit high computational complexity and consume large portions of total runtime may be suitable candidates for implementing as hardware accelerators. The hardware accelerators could be application specific integrated circuits (ASICs), graphics processing units (GPUs), or circuitry running on field programmable gate arrays (FPGAs), for example. A common approach employed by software designers in creating a hardware accelerator is to use a high-level synthesis (HLS) tool to convert the original high-level language (HLL) specification of the identified section into an equivalent register transfer level (RTL) or other hardware description language (HDL) specification of the circuit. The hardware description of the circuit can then be processed using synthesis, map, place-and-route, and bitstream generation tools to create configuration data for manufacturing a circuit or configuring programmable logic.

A typical scenario in debugging a hardware accelerator entails setting breakpoints in the HLL code and creating hardware that implements the breakpoints in the hardware accelerator. The hardware accelerator can then be run and will automatically stop when a state is reached that satisfies a specified breakpoint. Once the hardware accelerator stops, the user can read out the contents of selected registers, analyze the data, and resume running the hardware accelerator. As used herein, "stopping the clock" refers to stopping oscillations of the clock signal that drives the hardware accelerator, and "starting" or "restarting" the clock refers to enabling oscillations of the clock signal that drives the hardware accelerator.

Debugging a hardware accelerator can be extremely time-consuming. One type of breakpoint allows a user to specify a Boolean expression. In order to determine whether or not a Boolean expression has been satisfied, the clock signal that drives the hardware accelerator is stopped after each cycle to permit evaluation of the expression. If the breakpoint is satisfied, the clock remains stopped, which allows the user to examine the state of the hardware accelerator. Otherwise, the clock is automatically restarted. The repeated stopping of the clock, evaluating the expression, and restarting the clock significantly slows execution of the hardware accelerator.

Another type of breakpoint is an operation-specific breakpoint (OSBP). An OSBP involves a breakpoint set on a particular operation performed by the hardware accelerator. An OSBP can be established by setting a breakpoint on a line of HLL program code, and generating debugging circuitry that accompanies the hardware accelerator. The debugging circuitry can stop execution of the hardware accelerator when the designated operation is performed. If the operation having the breakpoint is performed repeatedly, manually restarting the clock can become tedious for the user.

SUMMARY

According to an exemplary circuit arrangement, an execution circuit is configured to input a plurality of data units, perform unit operations on the data units, and register results of the unit operations in response to oscillations of a clock signal. A control circuit is coupled to the execution circuit and is configured to control activation and deactivation of the unit operations. A debug circuit is coupled to the control circuit. The debug circuit is configured to input in parallel with input of each of the plurality of data units to the execution circuit, at least one of the data unit or one or more attributes associated with the data unit. The debug circuit evaluates, upon each input of the at least one of the data unit or the one or more attribute, a breakpoint condition based on the at least one of the data unit or the one or more attributes while the clock signal oscillates. In response to evaluation of the breakpoint condition indicating a break, the debug circuit stops oscillations of the clock signal to the execution circuit.

According to an exemplary method, a plurality of data units are input to an execution circuit. The execution circuit performs unit operations on the plurality of data units, and the timing of the unit operations is sequenced by oscillations of a clock signal. The method inputs to a debug circuit in parallel with input of each of the plurality of data units to the execution circuit, at least one of the data unit or one or more attributes associated with the data unit. The debug circuit evaluates, upon each input of the at least one of the data unit or one or more attributes associated with the data unit, a breakpoint condition based on the at least one of the data unit or the one or more attributes associated with the data unit while the clock signal oscillates. In response to evaluation of the breakpoint condition indicating a break, the debug circuit stops oscillations of the clock signal to the execution circuit.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and circuits support breakpoints on data units that are processed by a hardware accelerator. Instead of stopping execution of the hardware accelerator at a breakpoint on an operation or a particular condition, the disclosed approaches stop execution of the hardware accelerator when a tagged data unit is input for processing. A breakpoint specified on a data unit is referred to as a data-specific breakpoint ("DSBP"). Rather than stopping the clock signal that drives the hardware accelerator on every cycle to evaluate a condition, or stopping the clock signal at each initiation of a function corresponding to an OSBP, the disclosed methods and circuits allow the clock signal to continue to drive the hardware accelerator until a tagged data unit is input. A data unit can be a single data item, such as an integer variable, or a group of data items that are represented by a data unit identifier, such as a Data-Group in an OpenCL application. A breakpoint can be set on an individual data item or a group of data items depending on debugging preferences.

A function of an HLL program can be compiled by a high-level synthesis tool into a hardware accelerator that includes an execution circuit, a control circuit, and a debug circuit. The execution circuit is configured to input data units, perform unit operations on the data units, and register results of the unit operations in response to oscillations of a clock signal. The control circuit is configured to control activation and deactivation of the unit operations of the execution circuit. The control circuit can be a state machine, for example.

A DSBP can be established in a hardware accelerator by tagging a data unit to be processed by the hardware accelerator. A data unit can be tagged in the HLL program before compilation into the hardware accelerator or tagged after compilation. In tagging a data unit prior to compilation, the data unit(s) can be tagged, for example, by a comment associated with the identifier(s)/name(s) of the data unit(s) in the HLL program. In tagging a data unit after compilation, the compiler can generate a list of data unit identifiers that can be tagged with breakpoints, and a user can execute a debugging program that supports tagging selected data unit identifiers from the list with breakpoints.

A hardware accelerator typically performs multiple unit operations on an input data set, and a unit operation is a function performed by the hardware accelerator on an input data unit or on intermediate data generated during processing by the hardware accelerator. Examples of hardware accelerators include the kernel of a convolutional neural network (CNN), a Fast Fourier Transform (FFT), a Discrete Cosine Transform (DCT), and a Discrete Wavelet Transform (DWT). Multiplication and addition functions are examples of unit operations.

A debug circuit is coupled to the execution circuit and to the control circuit, and the debug circuit can be configured to implement one or more DSBPs. The debug circuit gates the clock signal to the execution circuit and allows the gated clock signal to continue to oscillate until a data unit having a breakpoint is input. In parallel with input of a data unit to the execution unit, the identifier of the data unit ("data unit identifier") is input to the debug circuit. The debug circuit compares each input data unit identifier to one or more breakpoint identifiers while the clock signal oscillates. Each breakpoint identifier is the identifier of a data unit tagged with a breakpoint. In response to an input data unit identifier matching a breakpoint identifier, the debug circuit stops oscillations of the clock signal provided to the execution circuit.

Figure 1:
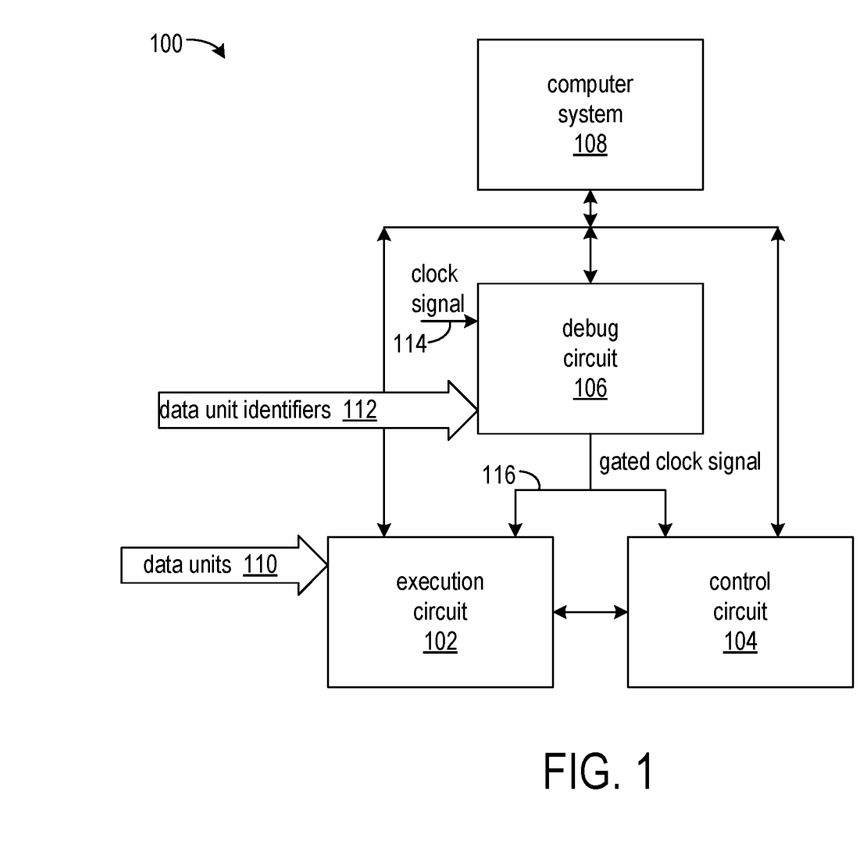
FIG. 1 shows an exemplary circuit arrangement that operates with data-specific breakpoints.

FIG. 1 shows an exemplary circuit arrangement 100 that operates with data-specific breakpoints. The circuit arrangement includes an execution circuit 102, a control circuit 104, a debug circuit 106, and a computer system 108. Data units 110 are input to the execution circuit 102 for processing, and in parallel, the data unit identifiers 112 of the data units are input to the debug circuit 106.

The computer system 108 is specifically programmed by a debugging program (not shown) through which operations of the execution circuit 102, control circuit 104, and debug circuit 106 can be controlled. The debugging program executing on the computer system translates user input key stroke and cursor sequences into corresponding configuration settings that can be stored in storage circuits in the execution circuit, control circuit, and debug circuit.

The execution circuit 102 inputs data units and performs unit operations on the input data units. The data units can be input from an FPGA, host computer system, or an external storage device. Results of each unit operation can be registered in a storage circuit in response to the oscillating input clock signal from the debug circuit 106. The debug circuit provides the oscillating clock signal 114 to the execution circuit 102 as gated clock signal 116. The execution circuit can be a central processing unit (CPU), graphics processing unit (GPU), or a circuit implemented in programmable logic, for example.

The control circuit ensures correct timing of each unit operation in the execution circuit and controls the time at which each unit operation implemented in the execution circuit is activated and deactivated.

The debug circuit 106 is coupled to the execution circuit, the control circuit, and the computer system 108. The debug circuit inputs data unit identifiers 112 in parallel with the data units that are input to the execution circuit 102. That is, as each data unit is input to the execution unit, the data unit identifier of that data unit is input to the debug circuit. The data unit identifiers can be generated by the HLS system (not shown) and associatively stored with the data units.

Through the debugging program executing on the computer system 108, one or more breakpoint identifiers can be input to the debug circuit 106, and the debug circuit stores the breakpoint identifiers. Each breakpoint identifier indicates a data unit on which the debug circuit should stop the oscillations of the clock signal to the execution circuit 102 and control circuit 104. As each data unit identifier is input, the debug circuit compares the input data unit identifier to the breakpoint identifier(s). The debug circuit continues to supply the oscillating clock signal 114 as the gated clock signal 116 to the execution circuit and the control circuit until an input data unit identifier matches a breakpoint identifier. In response to detecting a match, the debug circuit stops oscillations of the gated 116 clock signal.

The program code in Example 1 shows a function that could be implemented as a hardware accelerator. When implemented as a circuit, the program code can be implemented as a pipeline of unit operations. The first unit operation in the pipeline implements "temp0=din0*din1." The unit operations that implement "temp1=temp0+5" and "temp2=temp0*2" follow the first unit operation and can be performed in parallel. The if-else statement can be implemented as two alternative branches of the pipeline, each having two unit operations that implement the program statements within the respective clause.

```
void example (int din0, int din1, int*out)
{
   temp0=din0*din1;
   temp1=temp0+5;
   temp2=temp0*2;
   if (temp1>temp2) {
      temp3=temp1*temp2;
      *out=temp3+5;
   }
   else {
      temp4=temp1+temp2;
      *out=temp4*5;
   }
}
```

Example 1

The data units input to the function are named, "din0" and "din1." A breakpoint can be set on din0 and/or din1. If a breakpoint is set on din0, for example, the debug circuit 106 will find a match of the input data unit identifier "din0" accompanying the input data unit and the breakpoint identifier "din0." In response to the input data unit identifier matching any breakpoint identifier, the debug circuit stops oscillations of the gated clock signal 116 to the execution circuit.

When the debug circuit detects a DSBP and stops oscillations of the clock signal, the debug circuit signals the debugging program on the computer system 108. The debugging program, in response to stoppage of the clock, enables reading data from and/or writing data to registers in the execution circuit. Once the user has examined the state of the hardware accelerator, the user can input a command to the debugging program to signal to the debug circuit to resume oscillations of the clock signal to the execution circuit 102 and control circuit 104.

In some implementations, the execution circuit 102, control circuit 104, and debug circuit 106 are implemented in programmable logic. The programmable logic can be disposed on one or more integrated circuit die in an integrated circuit (IC) package, for example. The data units and data unit identifiers can be input from a computer system, a storage device external to the IC package, or storage circuits internal to the IC package.

Figure 2:
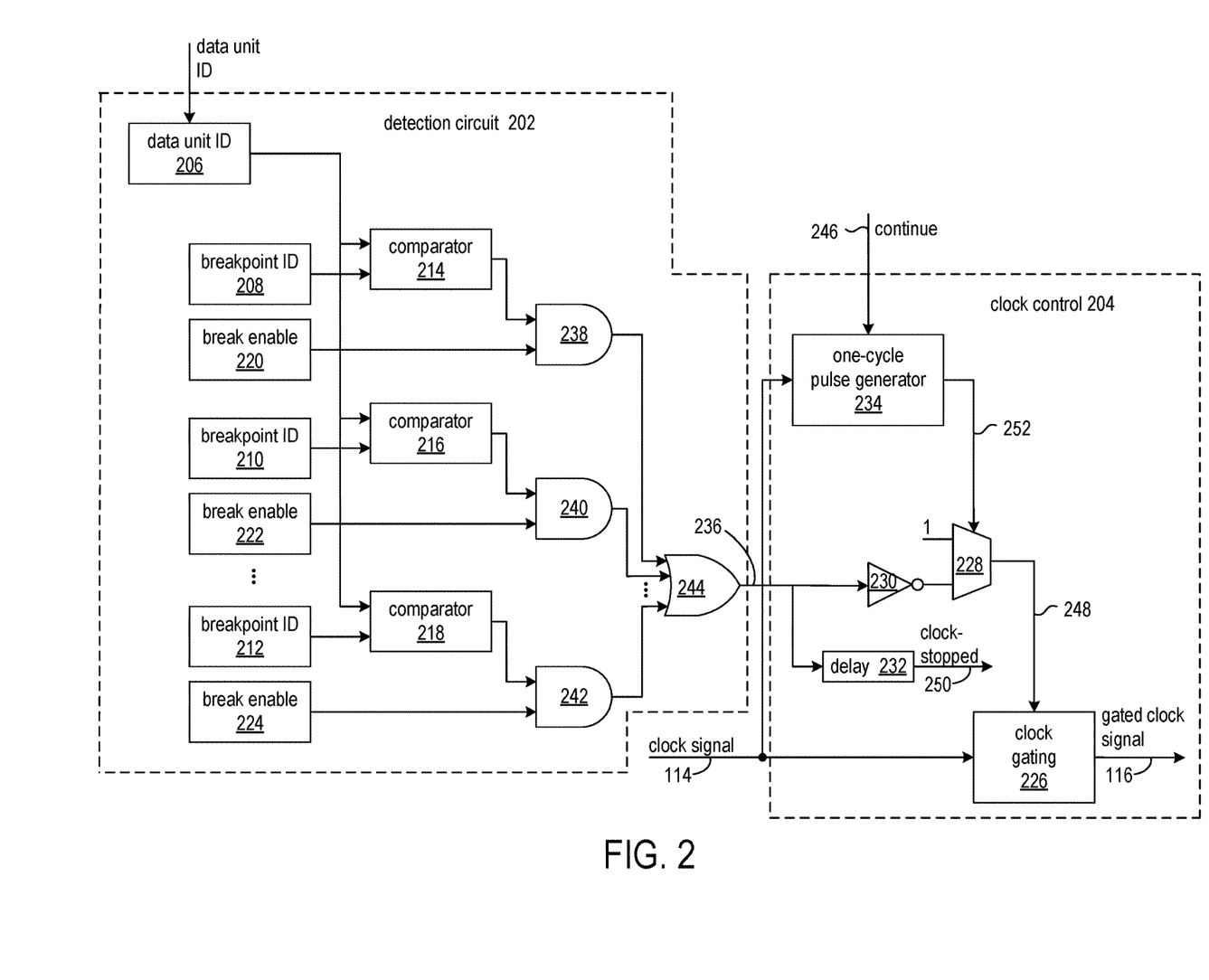
FIG. 2 shows an exemplary implementation of a debug circuit.

FIG. 2 shows an exemplary implementation of a debug circuit. The debug circuit includes a detection circuit 202 and a clock control circuit 204. The detection circuit is configured to compare each input data unit identifier ("ID") to a stored breakpoint ID(s) and generate a stop-clock signal having a state indicative of results of the comparison.

Each input data unit ID is stored in register 206. The identifier of each data unit tagged with a breakpoint ("breakpoint ID") is stored in one of registers 208, 210, . . . , 212. Comparator circuits 214, 216, . . . , 218 are multi-bit comparators that compare the respective, multi-bit breakpoint IDs to the input multi-bit data unit ID, and each comparator circuit generates a signal indicating whether or not the input data unit ID matches (are equal) the respective breakpoint ID.

As the input data unit ID can be any value, a respective break enable flag is associated with each breakpoint ID register 208, 210, . . . , 212. The states of the respective break enable flags are stored in control registers 220, 222, . . . , 224. In an exemplary implementation, if the value of a break enable flag is logic 0, then even if the associated breakpoint ID and input data unit ID match, the detection circuit will not signal to stop the clock based on the match. If the break enable flag is logic 1 (indicating a "break state"), the detection circuit will signal to stop the clock based on the match of the associated breakpoint ID and input data unit ID. Each of AND gates 238, 240, . . . , 242 inputs the output from a respective one of the comparators 214, 216, . . . , 218 and the state break enable flag from one of the registers 220, 222, . . . , 224, and the output from each AND gate signals a breakpoint only if the breakpoint ID matches the input data unit ID and the state of the break enable flag indicates that the breakpoint is enabled.

The OR gate 244 outputs the stop clock signal 236 that indicates if any breakpoint ID matched the input data unit ID and the associated break enable flag indicated breakpointing was enabled.

The values in the breakpoint ID registers 208, 210, . . . , 212 and break enable registers 220, 222, . . . 224 can be established by way of a boundary scan circuitry or established by compilation of the HLL program into a hardware accelerator and associated debug circuit.

Notably, the clock control circuit 204 continues to supply the oscillating gated clock 114 to the execution circuit 102 and control circuit 104 as new data unit IDs are input and compared to the breakpoint IDs as long as a DSBP is not detected. Whereas prior approaches stopped the clock to the executing circuitry at each cycle to evaluate breakpoint conditions, the disclosed circuits and methods allow the execution circuit and control circuit to continue to operate without stopping the clock until a data unit ID having a breakpoint is input.

The clock control circuit 204 controls the gated clock signal 116 in response to the stop clock signal 236 from the detection circuit and the continue signal 246, which can be input from a debugging program (not shown). In an exemplary implementation, when the signal 248 at the clock enable input of the clock gating circuit 226 is logic 1, the clock signal 114 is passed as the gated clock signal 116. When the signal 248 at the clock enable input of the clock gating circuit is logic 0, the clock gating circuit stops oscillations of the gated clock signal.

The stop clock signal 236 is passed through inverter 230, and the inverted stop clock signal is input to the multiplexer 228. Thus, when a breakpoint is detected, the signal 248 at the enable input of the clock gating circuit 226 is logic 0, and the clock gating circuit stops oscillations of the gated clock signal 116. The stop clock signal 236 is also routed through delay circuit 232 and output to the debugging program as clocked stopped signal 250. The clock stopped signal indicates to the debugging program that the contents of the registers of the execution circuit can be safely read. The delay is introduced to ensure that the contents of the registers are not read before the gated clock signal has stopped at all leaf branches of the clock distribution network in the execution circuit.

The continue signal 246 can be asserted by the debugging program, for example, after the user has read the contents of one or more registers of the execution circuit and the user directs the debugging program to continue with operations of the hardware accelerator. The continue signal is input to a one-cycle pulse generator 234 that generates a 0-1-0 pulse in response to a 0-1 transition of the continue signal. The 0-1-0 pulse on signal line 252 lasts one full cycle of the clock signal 114. The pulse controls multiplexer 228, which drives a logic 1 on signal line 248 to the enable input of the clock gating circuit 226. After the one-cycle pulse, the multiplexer 228 selects the output of inverter 230, which enables the clock gating circuit 226 to resume oscillations of the gated clock signal by passing the clock signal 114 until the next DSBP is reached.

Figure 3:
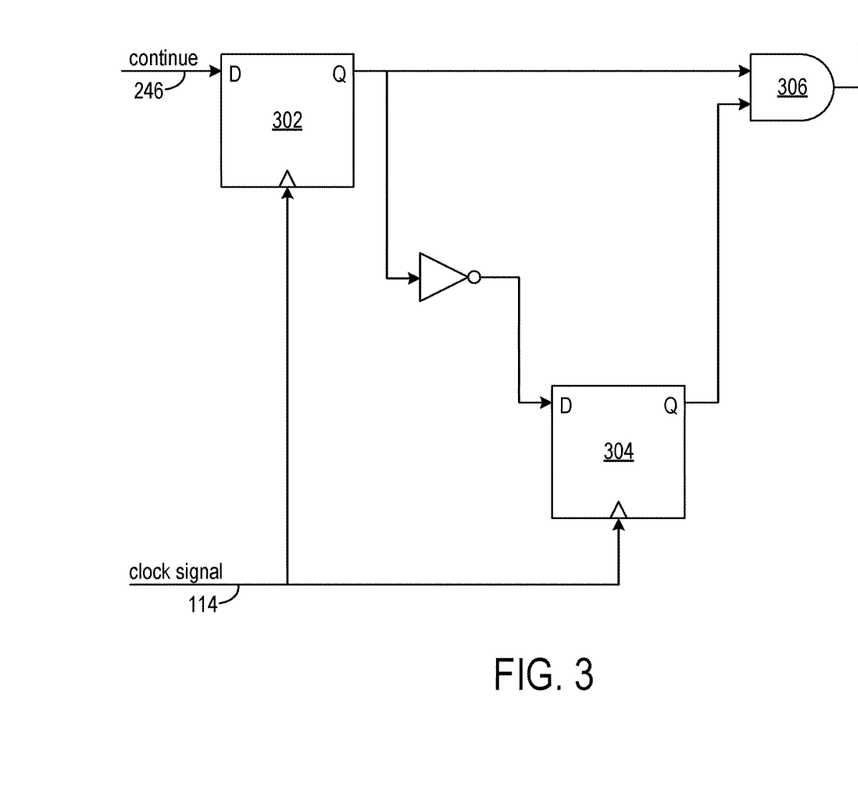
FIG. 3 is a circuit diagram of an exemplary one cycle pulse generator circuit.

FIG. 3 is a circuit diagram of an exemplary one cycle pulse generator circuit. In response to the continue signal 246 being logic 0, the output of AND gate 306 is 0. In response to the continue signal transitioning from logic 0 to logic 1 and captured in flip-flop 302 at the next edge of the clock signal 114, the output of the AND gate becomes logic 0. The output of the AND gate remains logic 1 for one cycle of the clock signal, after which the output of flip-flop 304 goes to logic 0, which causes the output of the AND gate to go to logic 0. Thus, the output of the AND gate is a pulse that lasts for one cycle of the clock signal 114. Though not shown, it will be recognized that the continue signal 246 and clock signal 114 are synchronized prior to driving the D input of flip-flop 302.

Figure 4:
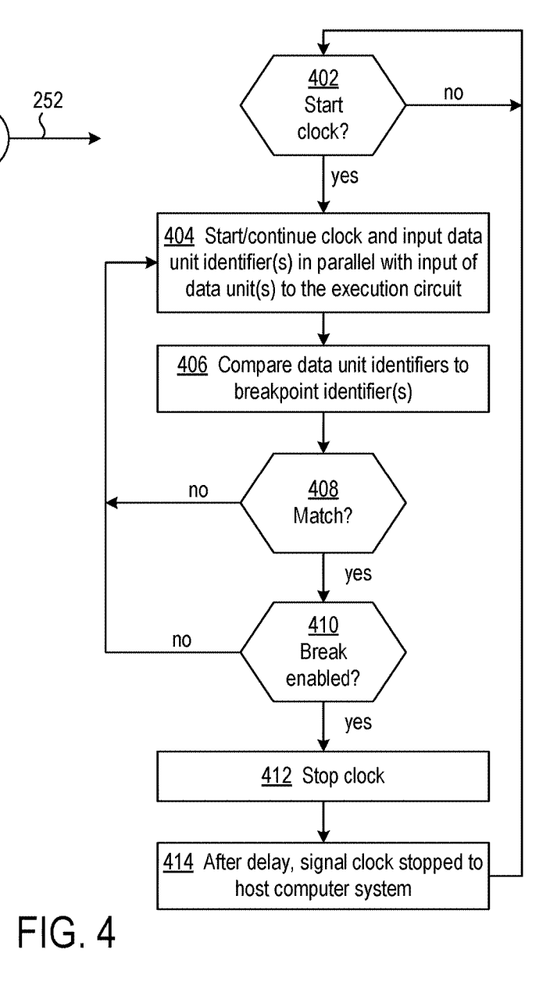
FIG. 4 is a flowchart of an exemplary process of handling data-specific breakpoint(s) by a debug circuit.

FIG. 4 is a flowchart of an exemplary process of handling data-specific breakpoint(s) by a debug circuit. The debug circuit controls oscillations of the clock signal provided to the execution circuit and control circuit of the hardware accelerator. At decision block 402, the debug circuit determines whether the clock signal should be started. The decision may be made based on a control signal from a debugging program as initiated by a user, for example.

If the debug circuit determines that the clock is to be started, at block 404, the clock is started and the debug circuit inputs a data unit identifier in parallel with input of the identified data unit to the execution circuit. That is, as each data unit is input to the execution circuit, the identifier of that data unit is input at the same time to the debug circuit.

At block 406, the debug circuit compares an input data unit identifier to each specified breakpoint identifier. If the data unit identifier matches a breakpoint identifier at decision block 408, and the state of the break enabled flag associated with that breakpoint identifier enables the breakpoint at decision block 410, the debug circuit stops the clock to the execution circuit and control circuit at block 412. After stopping the clock, at block 414 the debug circuit delays to allow the clock signal to stop at all leaf branches of the clock distribution network in the execution circuit, and then signals to the host computer system executing a debugging program that the clock to the hardware accelerator has been stopped. If the data unit identifier does not match a breakpoint identifier at decision block 408, or the state of the break enabled flag associated with that breakpoint identifier does not enable the breakpoint at decision block 410, the debug circuit returns to block 404 and the clock to the execution circuit and control circuit continues to run.

Rather than providing an n-bit data unit identifier for use in determining whether a DSBP is encountered as described above, the following circuits and methods can use the value of the input data unit and/or some other attribute associated with the data unit. An example of an attribute can be an extension bit associated with the data unit, an identifier of the data unit, or a counter value associated with a data unit. A counter value attribute can indicate the ordinal number of each data unit in an input data stream, for example. Alternatively, a programmable counter can be implemented in hardware and set by the user. The counter can generate a DSBP bit every time the counter overflows.

In another exemplary implementation, a debug circuit is coupled to the execution circuit and to the control circuit, and the debug circuit can be configured to implement one or more DSBPs. The debug circuit gates the clock signal to the execution circuit and allows the gated clock signal to continue to oscillate until a data unit having a breakpoint is input. In parallel with input of a data unit to the execution unit, the data unit and/or one or more attributes associated with the data unit can be input to the debug circuit. Upon input of a data unit and/or associated attribute(s), the debug circuit evaluates a DSBP condition that is based on the data unit and/or associated attribute(s) while the clock signal oscillates. In response to the data unit and/or associated attribute(s) indicating a breakpoint condition, the debug circuit stops oscillations of the clock signal provided to the execution circuit.

Figure 5:
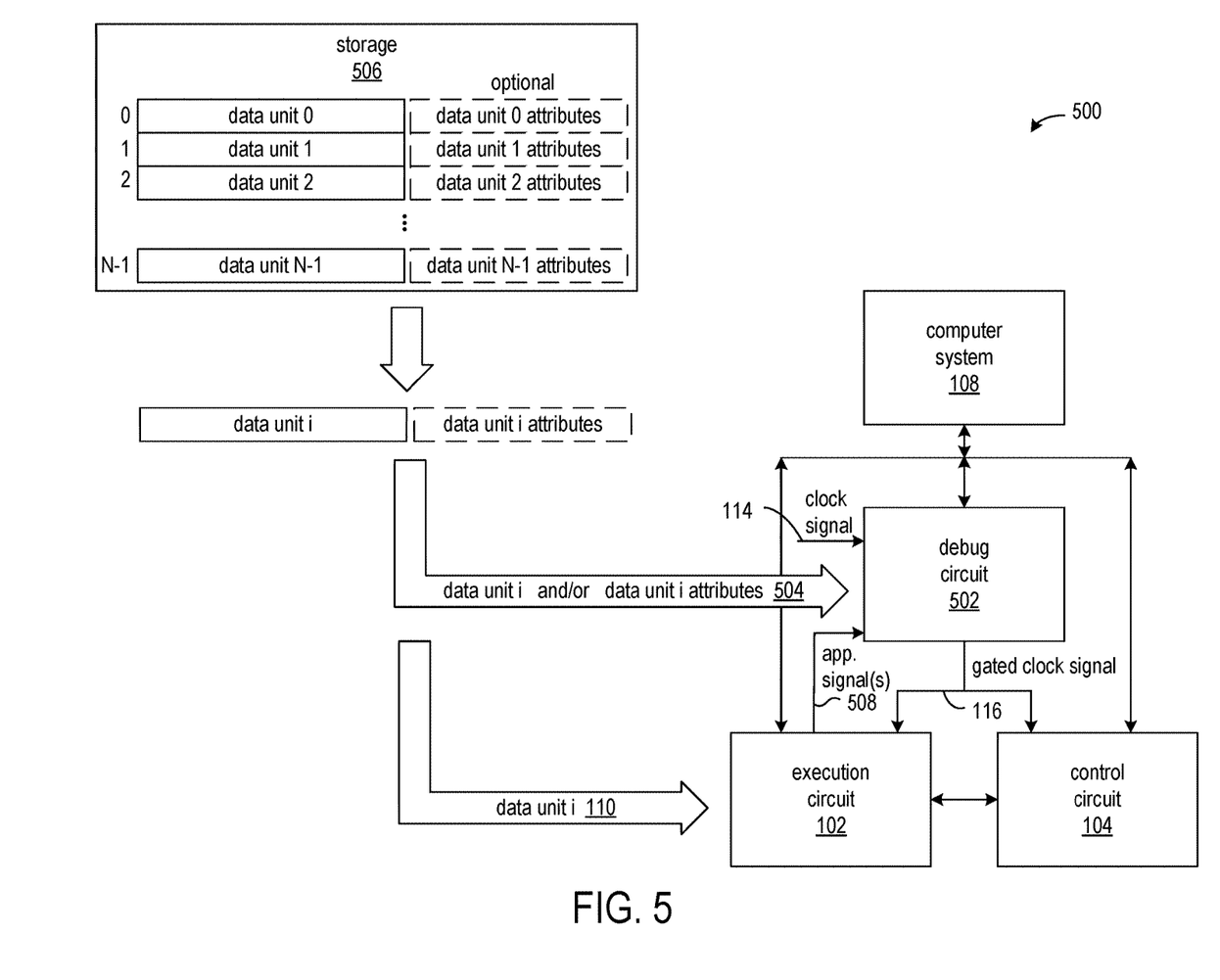
FIG. 5 shows an exemplary circuit arrangement that operates with data-specific breakpoints.

FIG. 5 shows an exemplary circuit arrangement 500 that operates with data-specific breakpoints. The circuit arrangement includes an execution circuit 102, a control circuit 104, a debug circuit 502, and a computer system 108. Data units 110 are input to the execution circuit 102 for processing, and in parallel, the data units and/or optional attributes associated with the data units 504 are input to the debug circuit 106. That is, as each data unit is input to the execution unit, the data unit and/or optional attribute is input to the debug circuit. The optional attributes can be generated by the HLS system or by the user of the system (not shown) and associatively stored with the data units. The data units and optional attributes can be input from storage circuits 506 of an FPGA, host computer system, or an external storage device. The exemplary storage circuit 506 shows N data units, numbered 0 through N−1 and optional attributes associated with the data units. The optional data unit attributes can be a single extension bit of the data unit. The value of the extension bit indicates whether a breakpoint has been specified for the data unit.

In an example involving the data unit extension, the original non-accelerated software function inputs a stream of 32-bit integers, and each 32-bit integer is the data unit on which a data specific breakpoint is desired. When the software function is implemented as a hardware accelerator, such as with an execution circuit 102 and a control circuit 104, the software driver generates a stream of 33-bit wide data having the 32-bit integer and a 1-bit extension bit.

Through the debugging program executing on the computer system 108, DSBP condition can be specified and input to the debug circuit 502. The DSBP condition can include a Boolean expression involving a data value of a data unit and/or a value(s) of an optional attribute(s). The Boolean expression can further include states of signals within the execution circuit 102. The signal states provided by the execution circuit 102 to the debug circuit are shown as application signals 508.

As each data unit and/or optional attribute is input, the debug circuit 502 evaluates the user-specified DSBP condition based on the data unit, optional attribute, and/or states of signals from the execution circuit. The debug circuit continues to supply the oscillating clock signal 114 as the gated clock signal 116 to the execution circuit and the control circuit until the DSBP condition evaluates to true. In response to the DSBP condition evaluating to true, the debug circuit stops oscillations of the gated 116 clock signal.

Figure 6:
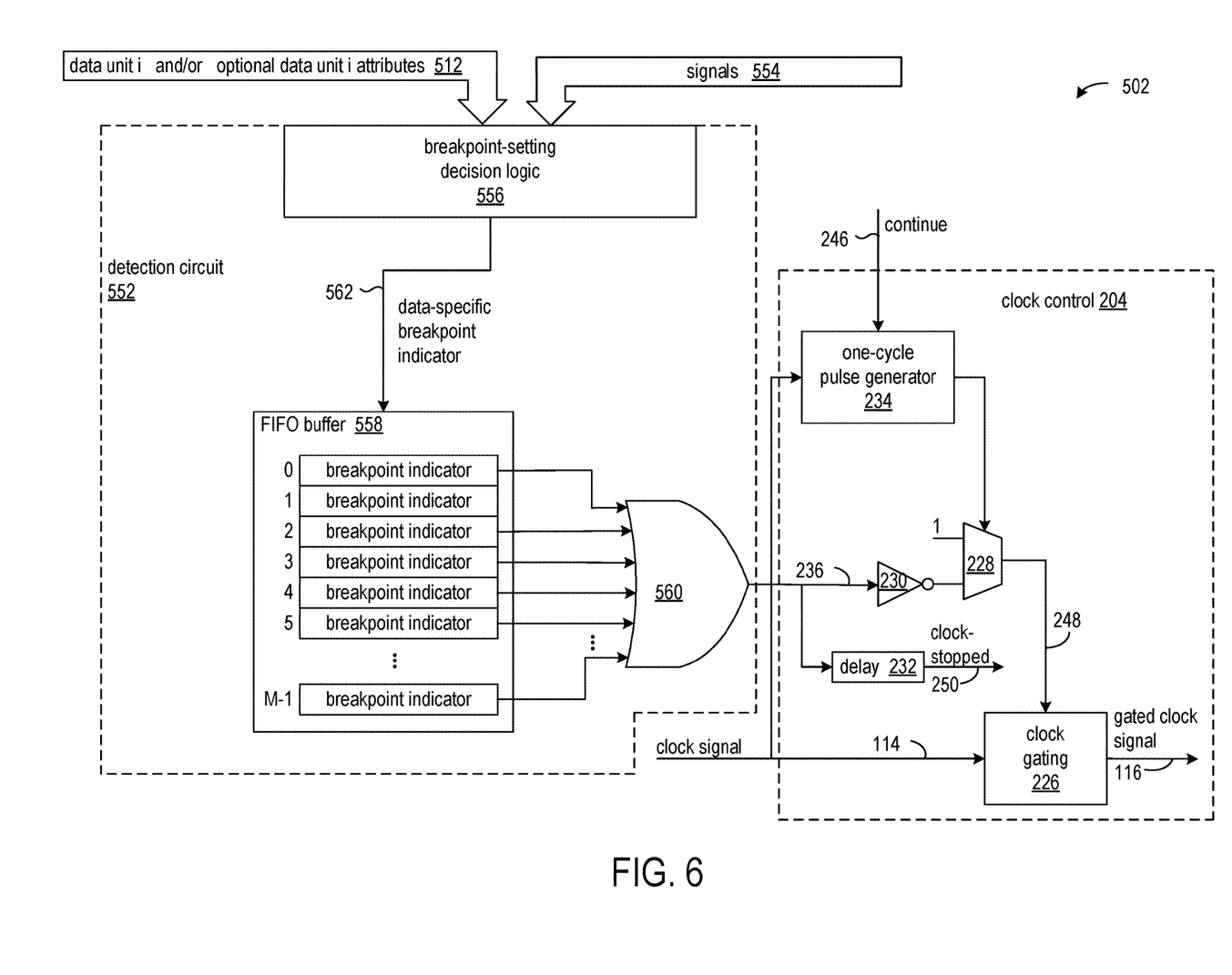
FIG. 6 shows an exemplary implementation of debug circuit.

FIG. 6 shows an exemplary implementation of debug circuit 502. The debug circuit includes a detection circuit 552 and a clock control circuit 204. The detection circuit is configured to evaluate a DSBP condition, load the result of the evaluation as a breakpoint indicator into a first-in-first-out (FIFO) buffer, check the states of the breakpoint indicators in the FIFO buffer, and generate a stop-clock signal having a state indicating a breakpoint.

The breakpoint-setting decision logic generates a signal 562 having a state that indicates the result of evaluation of the DSBP condition. The detection circuit includes breakpoint-setting decision logic 556, FIFO buffer 558, and OR logic 560. The breakpoint-setting decision logic inputs data units and/or optional attributes associated with the data units 512, and can also input application signals 514. A DSBP condition is evaluated by the breakpoint-setting decision logic evaluated based on the inputs. Depending on the implementation and application debugging requirements, the DSBP condition can be a Boolean expression involving a particular value for a data item or the value of an associated attribute. The DSBP condition can further specify the states of one or more application signals 554.

Breakpoint-setting decision logic can be implemented in either software or hardware as hardwired or programmable logic integrated into the debug circuit 502 or as a separate circuit outside the debug circuit, for example. This approach subsumes the data-unit identifier approach since for a data-unit identifier, a similar expression can be evaluated and a single-bit breakpoint-setting generated from evaluation of the expression. Breakpoint-setting logic can also be implemented in the debugger computer system 108, in which case the Boolean decision bit can be sent along with the data unit. Breakpoint-setting decision logic can also include circuitry that factors the DSBP with states of signals from the execution circuit 102 into a Boolean expression. The signals and Boolean expression can be specified by a user and configured as a circuit by the debugger computer system.

The detection circuit latches the results from the breakpoint-setting decision logic as DSBP indicators in FIFO buffer 558. In an exemplary implementation, the DSBP indicator can be a single bit in which a logic 1 indicates a breakpoint and logic 0 indicates no breakpoint. The depth of the FIFO buffer can be the maximum number of data units being processed in different stages within the execution circuit at any time.

One approach for determining the depth, M, of the FIFO buffer can be based on the clock frequency, f, the latency, L, and the throughput, T, of the application running in the execution circuit. The latency, L, is the number of clock cycles required for a data unit to be processed by the execution circuit, or the number of clock cycles from the time that a data unit enters the execution plane until all results derived from the data unit have been either stored or used. The throughput, T, is the number of data units that are processed per second. The number of clock cycles per data unit can be expressed as f/T, which is the number of clock cycles between inputs of consecutive data units to the pipeline of the execution circuit, and is also the number of clock cycles between consecutive writes to the FIFO buffer 558. The minimum depth, M, of the FIFO buffer can be calculated as:

$$M \geq \left\lceil \frac{LT}{f} \right\rceil$$

The FIFO buffer can be implemented as a shift register in which the input is updated every f/T clock cycles. The clock stop signal 236 is generated by the OR circuit 560, which performs an OR logic function on the M data-specific breakpoint indicators in the FIFO buffer 558.

An alternative approach to expressing calculation of the depth of the FIFO buffer can be based on the latency, L, and the initialization interval, II, of the application running in the execution circuit. The initialization interval is the number of clock cycles between inputs of consecutive data units to the pipeline of the execution circuit. The initialization interval is also the number of clock cycles between consecutive writes to the FIFO buffer 558. The minimum depth, M, of the FIFO buffer can be calculated as:

$$M \geq \left\lceil \frac{L}{II} \right\rceil$$

The clock control circuit 204 controls the gated clock signal 116 in response to the stop clock signal 236 from the detection circuit and the continue signal 246, which can be input from a debugging program (not shown). In an exemplary implementation, when the signal 248 at the clock enable input of the clock gating circuit 226 is logic 1, the clock signal 114 is passed as the gated clock signal 116. When the signal 248 at the clock enable input of the clock gating circuit is logic 0, the clock gating circuit stops oscillations of the gated clock signal.

The stop clock signal 236 is passed through inverter 230, and the inverted stop clock signal is input to the multiplexer 228. Thus, when a breakpoint is detected, the signal 248 at the enable input of the clock gating circuit 226 is logic 0, and the clock gating circuit stops oscillations of the gated clock signal 116. The stop clock signal 236 is also routed through delay circuit 232 and output to the debugging program as clock-stopped signal 250. The clock stopped signal indicates to the debugging program that the contents of the registers of the execution circuit can be safely read. The delay is introduced to ensure that the debugging program does not attempt to read the contents of the registers before the gated clock signal has stopped at all leaf branches of the clock distribution network in the execution circuit. The delay introduced is large enough for all leaf branches of the clock signal to have stopped.

The continue signal 246 can be asserted by the debugging program, for example, after the user has read the contents of one or more registers of the execution circuit and the user directs the debugging program to continue with operations of the hardware accelerator. The continue signal is input to a one-cycle pulse generator 234 that generates a 0-1-0 pulse in response to a 0-1 transition of the continue signal. The 0-1-0 pulse on signal line 252 lasts one full cycle of the clock signal 114. The pulse controls multiplexer 228, which drives a logic 1 on signal line 248 to the enable input of the clock gating circuit 226. After the one-cycle pulse, the multiplexer 228 selects the output of inverter 230, which enables the clock gating circuit 226 to resume oscillations of the gated clock signal by passing the clock signal 114 until the next DSBP is reached.

Figure 7:
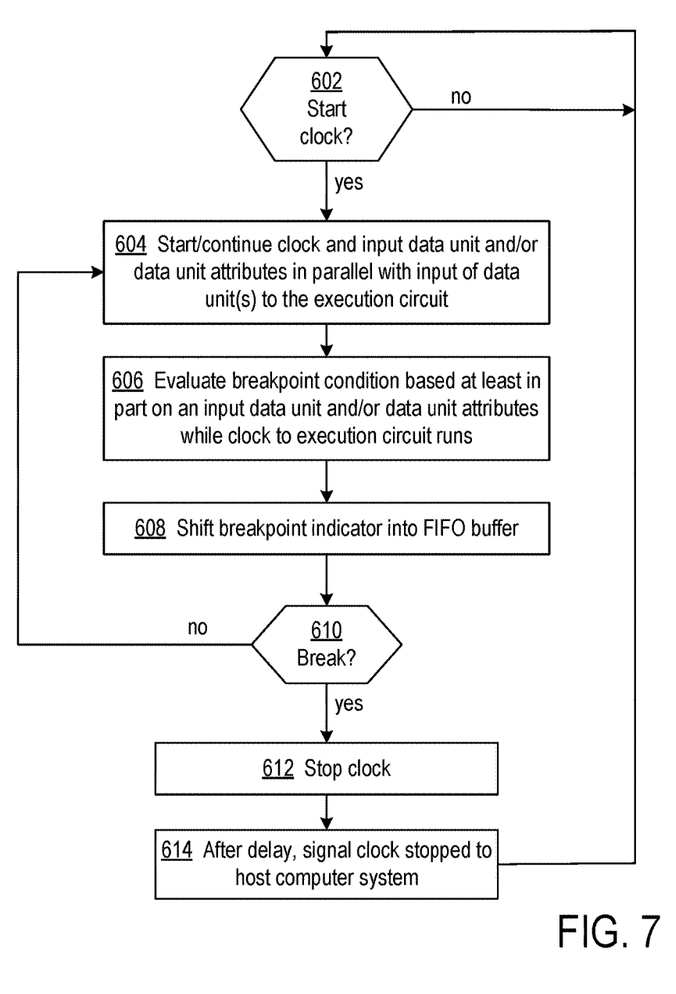
FIG. 7 is a flowchart of an exemplary process of handling data-specific breakpoint(s) by a debug circuit.

FIG. 7 is a flowchart of an exemplary process of handling data-specific breakpoint(s) by a debug circuit. The debug circuit controls oscillations of the clock signal provided to the execution circuit and control circuit of the hardware accelerator. At decision block 602, the debug circuit determines whether the clock signal should be started. The decision can be made based on a control signal from a debugging program as initiated by a user, for example.

If the debug circuit determines that the clock is to be started, at block 604, the clock is started and the debug circuit inputs a data unit and/or optional attributes associated with the data unit in parallel with input of the data unit to the execution circuit. That is, as each data unit is input to the execution circuit, the data unit and/or optional attributes associated with the data unit are input at the same time to the debug circuit. The debug circuit can further input signals from the execution unit at block 604.

At block 606, the debug circuit evaluates the DSBP condition. The DSBP condition is based at least in part on the data unit and/or one or more associated attributes of the data unit. For example, the DSBP condition can be a Boolean expression in which one of the terms is the data unit or one of the terms is an attribute of the data unit. The Boolean expression can further include terms corresponding to signals from the execution circuit. The evaluation of the DSBP condition is performed while the clock to the execution and control circuits continues to run.

The debug circuit shifts the value representing the result of the evaluation of the DSBP condition into the FIFO buffer 558 at block 608. The evaluation result is referred to as the "breakpoint indicator." For example, if the DSBP condition evaluated to true, the breakpoint indicator can be logic 1, and if the DSBP condition evaluated to false, the breakpoint indicator can be logic 0. Decision block 610 tests whether any of the breakpoint indicators in the FIFO buffer indicate a break. If so, the debug circuit stops the clock to the execution circuit and control circuit at block 612. After stopping the clock, at block 614 the debug circuit delays to allow the clock signal to stop at all leaf branches of the clock distribution network in the execution circuit, and then signals to the host computer system executing a debugging program that the clock to the hardware accelerator has been stopped. The process then continues at block 602 to await a continue signal from the host debugger system. If none of the breakpoint indicators in the FIFO buffer indicate a break, the debug circuit returns to block 604 where the clock to the execution circuit and control circuit continues to run.

Figure 8:
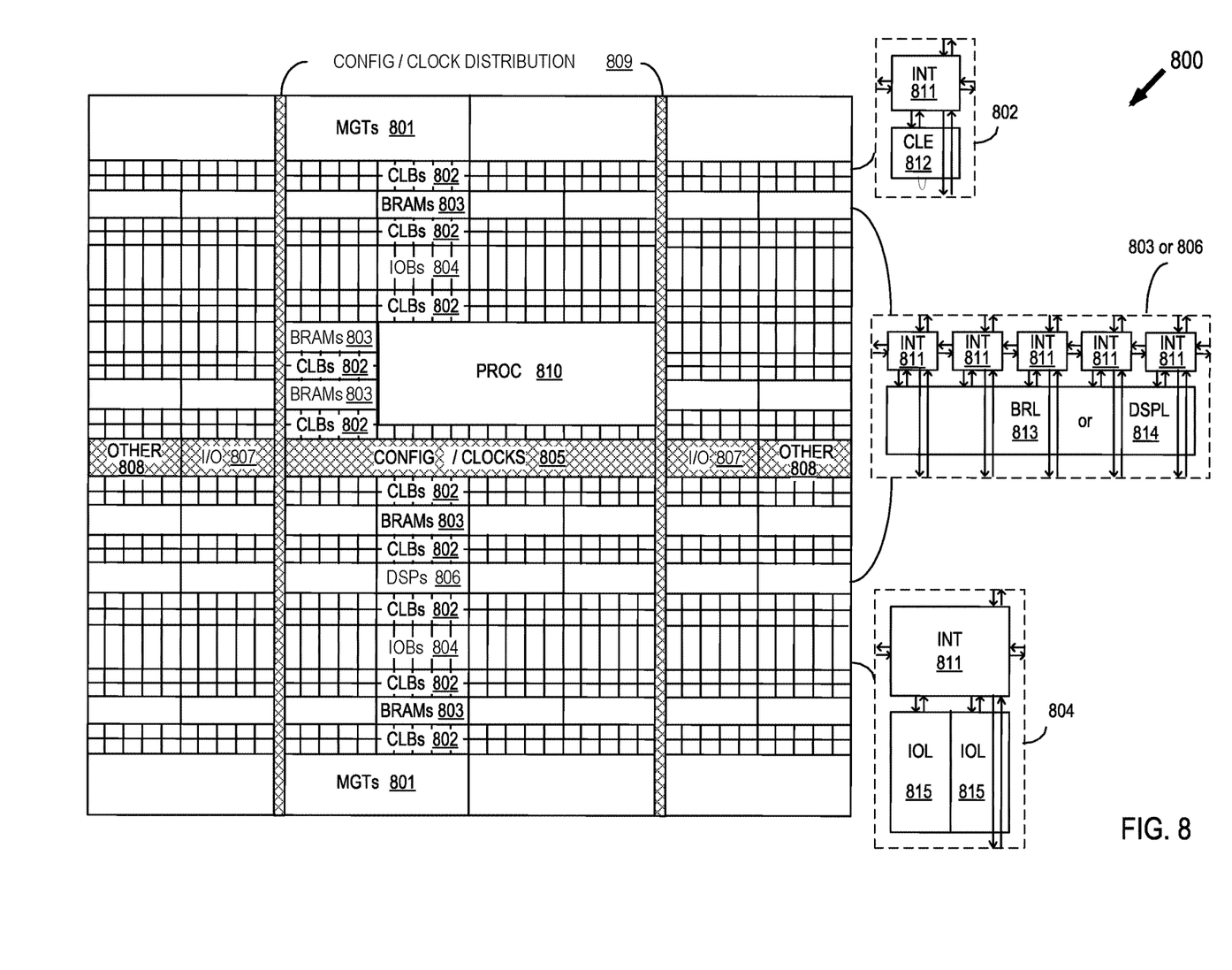
FIG. 8 shows a programmable integrated circuit (IC) on which the disclosed circuits and processes may be implemented.

FIG. 8 shows a programmable integrated circuit (IC) 800 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 8 illustrates programmable IC 800 that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some programmable IC having FPGA logic also include dedicated processor blocks (PROC) 810 and internal and external reconfiguration ports (not shown).

In some FPGA logic, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA logic. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element (DSPL) 814 in addition to an appropriate number of programmable interconnect elements. An 10B 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

In the pictured embodiment, a columnar area near the center of the die (shown shaded in FIG. 8) is used for configuration, clock, and other control logic. Horizontal areas 809 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 8 include additional logic blocks that disrupt the regular columnar structure making up a large part of the programmable IC. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual programmable IC, more than one adjacent column of CLBs is typically included wherever the CLBs appear, to facilitate the efficient implementation of user logic.

Figure 9:
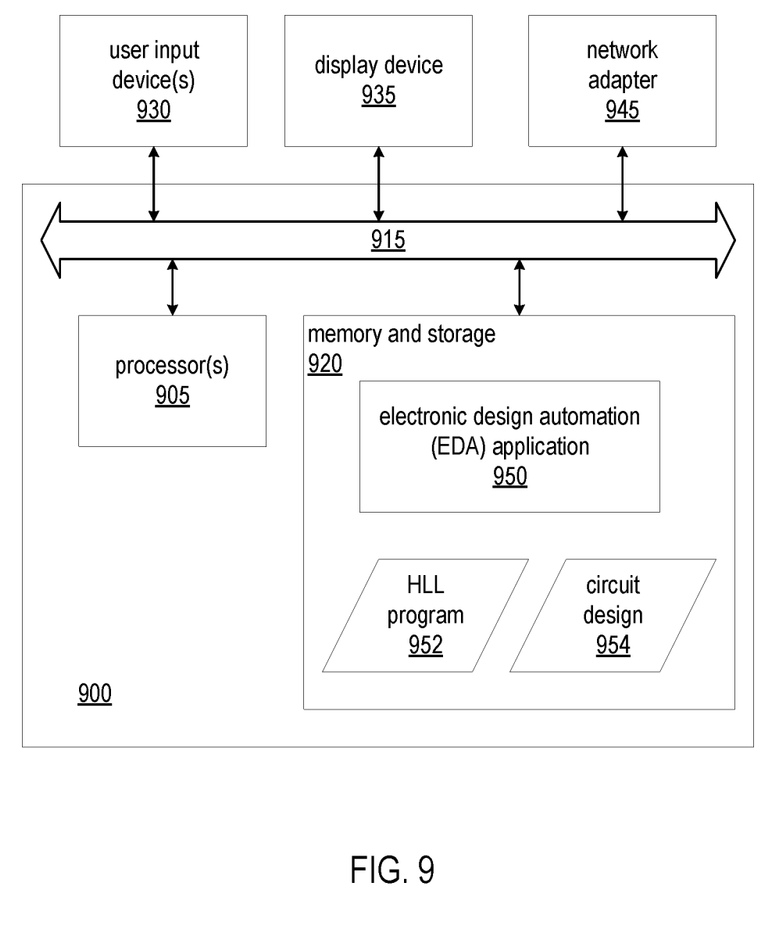
FIG. 9 is a block diagram illustrating an exemplary computer system.

FIG. 9 is a block diagram illustrating an exemplary computer system (system) 900. System 900 is an example of an EDA system. As pictured, system 900 includes at least one processor circuit (or "processor"), e.g., a central processing unit (CPU) 905 coupled to memory and storage arrangement 920 through a system bus 915 or other suitable circuitry. System 900 stores program code and circuit design 952 within memory and storage arrangement 920. Processor 905 executes the program code accessed from the memory and storage arrangement 920 via system bus 915. In one aspect, system 900 is implemented as a computer or other data processing system that is suitable for storing and/or executing program code. It should be appreciated, however, that system 900 can be implemented in the form of any system including a processor and memory that is capable of performing the functions described within this disclosure.

Memory and storage arrangement 920 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 900 may also include one or more cache memories (not shown) that provide temporary storage of at least some program code and data in order to reduce the number of times program code and data must be retrieved from local memory and persistent storage during execution.

Input/output (I/O) devices such as user input device(s) 930 and a display device 935 may be optionally coupled to system 900. The I/O devices may be coupled to system 900 either directly or through intervening I/O controllers. A network adapter 945 also can be coupled to system 900 in order to couple system 900 to other systems, computer systems, remote printers, and/or remote storage devices through intervening private or public networks. Modems, cable modems, Ethernet cards, and wireless transceivers are examples of different types of network adapter 945 that can be used with system 900.

Memory and storage arrangement 920 may store an EDA application 950. EDA application 950, being implemented in the form of executable program code, is executed by processor(s) 905. As such, EDA application 950 is considered part of system 900. System 900, while executing EDA application 950, receives and operates on HLL program 952. In one aspect, system 900 performs a design flow on HLL program 952, and the design flow can include synthesis, mapping, placement, routing, and host the debugging program as described herein. System 900 generates a hardware accelerator version of HLL program 952 as circuit design 954.

EDA application 950, HLL program 952, circuit design 954, and any data items used, generated, and/or operated upon by EDA application 950 are functional data structures that impart functionality when employed as part of system 900 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for debugging circuits generated from HLL programs. Other aspects and features will be apparent to those skilled in the art from consideration of the specification. It is intended that the specification and drawings be considered as examples only, with a true scope of the invention being indicated by the following claims.

What is claimed is:

1. A circuit arrangement comprising:
  an execution circuit configured to:
    input a plurality of data units,
    perform unit operations on the data units, and
    register results of the unit operations in response to oscillations of a clock signal;
  a control circuit coupled to the execution circuit and configured to control activation and deactivation of the unit operations; and
  a debug circuit coupled to the control circuit and configured to:
    input in parallel with input of each of the plurality of data units to the execution circuit, a data unit identifier associated with the data unit,
    compare each data unit identifier to one or more breakpoint identifiers while the clock signal oscillates,
    evaluate, upon each input of the data unit identifier, a breakpoint condition based on the data unit identifier while the clock signal oscillates, and
    stop oscillations of the clock signal in response to evaluation of the breakpoint condition indicating a break; and
  wherein the execution circuit, control circuit, and debug circuit are implemented in programmable logic of a programmable integrated circuit (IC).

2. The circuit arrangement of claim 1, wherein the debug circuit is further configured to:
  input one or more signals from the execution circuit; and
  evaluate the breakpoint condition based on states of the one or more signals and the data unit identifier associated with the data unit.

3. The circuit arrangement of claim 1, wherein the debug circuit is further configured to:
  input in parallel with input of each of the plurality of data units to the execution circuit, one or more attributes associated with the data unit, the one or more attributes including a data unit extension associated with the data unit, and a state of the data unit extension specifies whether to stop the oscillations of the clock signal; and
  evaluate the breakpoint condition based on a state of the data unit extension associated with the data unit.

4. The circuit arrangement of claim 1, wherein the debug circuit is further configured to:
  generate a breakpoint signal having a state indicating whether or not the evaluation of the breakpoint condition indicates a break;
  store in a first-in-first-out (FIFO) buffer, the state of the breakpoint signal resulting from each evaluation of the breakpoint condition; and
  stop oscillations of the clock signal in response to the state of the breakpoint signal at any location in the FIFO buffer indicating a break.

5. The circuit arrangement of claim 1, further comprising:
  a computer system coupled to the debug circuit, wherein the computer system is configured to input commands from a user for stopping and starting the execution circuit and reading data from registers in the execution circuit;
  wherein the debug circuit is further configured to signal the computer system that the oscillations of the clock signal have been stopped in response to stopping the oscillations of the clock signal; and
  wherein the computer system is further configured to enable reading data from the registers in the execution circuit in response to the signal from the debug circuit indicating that the oscillations of the clock signal have been stopped.

6. The circuit arrangement of claim 1, wherein:
  the debug circuit includes:
    a detection circuit configured to generate a stop-clock signal having a state indicating the break; and
    a clock control circuit coupled to receive the stop-clock signal and a start-clock signal, wherein the clock control circuit is configured to:
      output the clock signal to the execution circuit;
      stop the oscillations of the clock signal in response to the stop-clock signal; and
      start the oscillations of the clock signal in response to start-clock signal.

7. The circuit arrangement of claim 6, wherein:
  the detection circuit includes:
    a first-in-first-out (FIFO) buffer; and
    an evaluation circuit coupled to the FIFO buffer and coupled to receive the data unit identifier associated with the data unit, wherein the evaluation circuit is configured to:

generate a breakpoint signal having a state indicating whether or not the evaluation of the breakpoint condition indicates a break, and store in the FIFO buffer, the state of the breakpoint signal resulting from each evaluation of the breakpoint condition; and the clock control circuit is configured to stop oscillations of the clock signal in response to the state of the breakpoint signal at any location in the FIFO buffer indicating a break.

8. The circuit arrangement of claim 1, wherein:

the debug circuit is further configured to stop oscillations of the clock signal in response to one of the data unit identifiers matching one of the breakpoint identifiers.

9. The circuit arrangement of claim 8, wherein the debug circuit is further configured to:

compare each data unit identifier to a plurality of breakpoint identifiers while the clock signal oscillates, and stop oscillations of the clock signal in response to the data unit identifier matching any one of the breakpoint identifiers.

10. The circuit arrangement of claim 8, wherein the debug circuit includes a control register for storing a break enable flag, and the debug circuit is further configured to disable stopping the oscillations of the clock signal in response to a state of the break enable flag.

11. The circuit arrangement of claim 8, wherein the one or more breakpoint identifiers is a plurality of breakpoint identifiers, and the debug circuit includes a plurality of first registers for storing the breakpoint identifiers.

12. The circuit arrangement of claim 11, wherein the debug circuit includes a plurality of second registers for storing a plurality of break enable flags that correspond to the plurality of breakpoint identifiers, and for each breakpoint identifier the debug circuit is further configured to disable stopping the oscillations of the clock signal in response to a state of the corresponding break enable flag.

13. The circuit arrangement of claim 1, wherein:

the programmable logic is disposed on one or more integrated circuit die in an integrated circuit (IC) package; and the data unit identifier associated with the data unit are input to the debug circuit in the IC package from one of a computer system, a storage device external to the IC package, or storage circuits internal to the IC package.

14. A method, comprising:

inputting a plurality of data units to an execution circuit implemented in programmable logic of a programmable integrated circuit (IC);

performing unit operations on the plurality of data units by the execution circuit;

timing the unit operations in response to oscillations of a clock signal;

inputting to a debug circuit implemented in the programmable logic and in parallel with input of each of the plurality of data units to the execution circuit, a data unit identifier associated with the data unit;

comparing by the debug circuit, each data unit identifier to one or more breakpoint identifiers while the clock signal oscillates;

evaluating by the debug circuit, upon each input of the at least one of each data unit or at least one attribute associated with the data unit, a breakpoint condition based on the data unit identifier associated with the data unit while the clock signal oscillates; and stopping oscillations of the clock signal by the debug circuit in response to evaluation of the breakpoint condition indicating a break.

15. The method of claim 14, further comprising:

inputting one or more attributes associated with the data unit, the one or more attributes including a data unit extension associated with the data unit, and a state of the data unit extension specifies whether to stop the oscillations of the clock signal; and evaluating the breakpoint condition based on a state of the data unit extension associated with the data unit.

16. The method of claim 14, further comprising:

generating by the debug circuit a breakpoint signal having a state indicating whether or not the evaluation of the breakpoint condition indicates a break;

storing in a first-in-first-out (FIFO) buffer, the state of the breakpoint signal resulting from each evaluation of the breakpoint condition; and stopping oscillations of the clock signal in response to the state of the breakpoint signal at any location in the FIFO buffer indicating a break.

17. The method of claim 14, wherein the method further includes stopping oscillations of the clock signal in response to the data unit identifier matching one of the breakpoint identifiers.

18. The method of claim 14, further comprising:

comparing by the debug circuit, each data unit identifier to a plurality of breakpoint identifiers while the clock signal oscillates; and stopping oscillations of the clock signal in response to the data unit identifier matching any one of the breakpoint identifiers.

19. The method of claim 18, further comprising:

storing a plurality of break enable flags in a plurality of control registers associated with the plurality of breakpoint identifiers; and stopping the oscillations of the clock signal in response to a match of one of the breakpoint identifiers and the one of the data unit identifiers and a break state of the break enable flag in the control register associated with the one of the breakpoint identifiers.

20. A circuit arrangement, comprising:

an execution circuit configured to:

input a plurality of data units, perform unit operations on the data units, and register results of the unit operations in response to oscillations of a clock signal;

a control circuit coupled to the execution circuit and configured to control activation and deactivation of the unit operations; and a debug circuit coupled to the control circuit and configured to:

input in parallel with input of each of the plurality of data units to the execution circuit, a data unit identifier associated with the data unit, compare each data unit identifier to one or more breakpoint identifiers while the clock signal oscillates, evaluate, upon each input of the data unit identifier, a breakpoint condition based on the data unit identifier while the clock signal oscillates, stop oscillations of the clock signal in response to one of the data unit identifiers matching one of the breakpoint identifiers, and stop oscillations of the clock signal in response to evaluation of the breakpoint condition indicating a break;

wherein the one or more breakpoint identifiers is a plurality of breakpoint identifiers, and the debug circuit includes a plurality of first registers for storing the breakpoint identifiers; and wherein the debug circuit includes a plurality of second registers for storing a plurality of break enable flags that correspond to the plurality of breakpoint identifiers, and for each breakpoint identifier the debug circuit is further configured to disable stopping the oscillations of the clock signal in response to a state of the corresponding break enable flag.

* * * * *